United States Patent
Singh

(10) Patent No.: US 10,604,015 B1
(45) Date of Patent: Mar. 31, 2020

(54) INDICATING DRIVING BATTERY CHARGER RELATED INFORMATION INSIDE AN ELECTRIC VEHICLE TO A USER OF THE ELECTRIC VEHICLE

(71) Applicant: Sanjeev Kumar Singh, Alpharetta, GA (US)

(72) Inventor: Sanjeev Kumar Singh, Alpharetta, GA (US)

( * ) Notice: Subject to any disclaimer, the term of this patent is extended or adjusted under 35 U.S.C. 154(b) by 0 days.

(21) Appl. No.: 16/291,095

(22) Filed: Mar. 4, 2019

(51) Int. Cl.
  *B60Q 1/00*   (2006.01)
  *B60K 37/02*  (2006.01)

(52) U.S. Cl.
  CPC ........ *B60K 37/02* (2013.01); *B60K 2370/155* (2019.05); *B60K 2370/157* (2019.05); *B60K 2370/161* (2019.05)

(58) Field of Classification Search
  CPC ............. B60K 37/02; B60K 2370/161; B60K 2370/157; B60K 2370/155
  See application file for complete search history.

(56) References Cited

U.S. PATENT DOCUMENTS

| | | | |
|---|---|---|---|
| 9,669,719 B1* | 6/2017 | Gerber | B60L 11/1838 |
| 2016/0221458 A1* | 8/2016 | Lopez | H05K 7/20927 |
| 2017/0140603 A1* | 5/2017 | Ricci | B60L 11/182 |
| 2019/0255963 A1* | 8/2019 | Goei | B60L 53/16 |
| 2019/0383637 A1* | 12/2019 | Teske | G01C 21/3682 |

\* cited by examiner

*Primary Examiner* — Phung Nguyen
(74) *Attorney, Agent, or Firm* — Sanjeen K. Singh

(57) ABSTRACT

A plug-in electric vehicle comprises means for indicating driving battery charger related information inside the plug-in electric vehicle to a user of the plug-in electric vehicle. The plug-in electric vehicle comprises a battery pack for solely propelling the electrical vehicle, a dashboard configured for displaying various information about vehicle metrics and a user interface located in the dashboard of the electric vehicle. The user interface is configured for indicating information in the electric vehicle to a user of the vehicle and the user interface including an indicator having a symbol that displays a charge port pin format associated with a charge port of the electric vehicle that is used for externally charging the electric vehicle. The indicator further includes a pointer that points to a physical location of the charge port being external to the electric vehicle in terms of an orientation of the charge port relative to a driver seat.

20 Claims, 6 Drawing Sheets

Type 2 Female
Plug Pinout

Type 2 Male
Plug Pinout

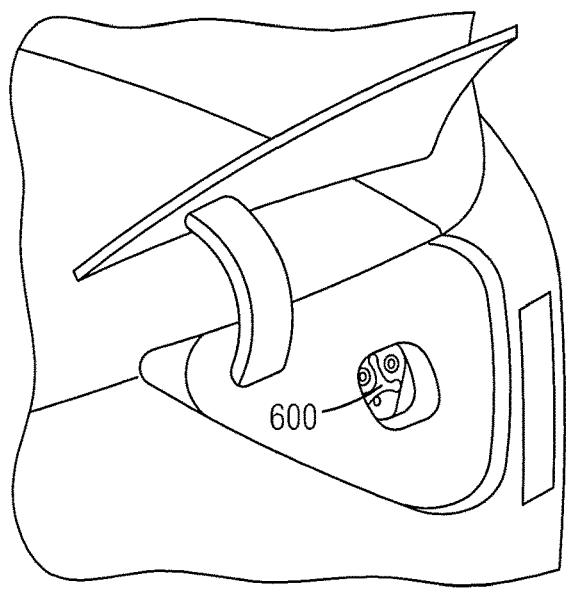
FIG. 6
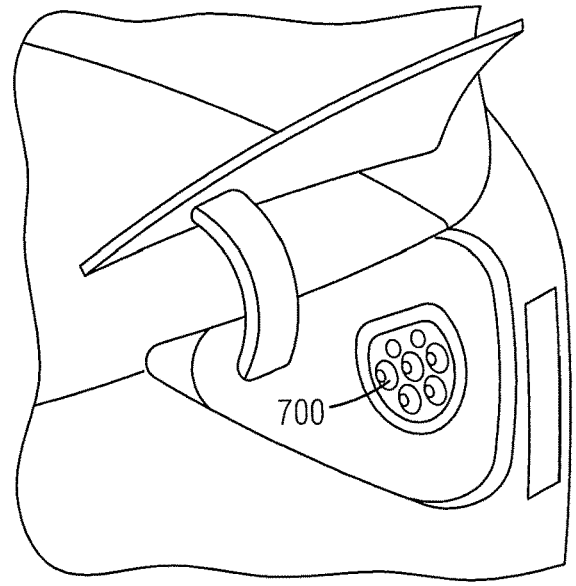
FIG. 7
FIG. 8
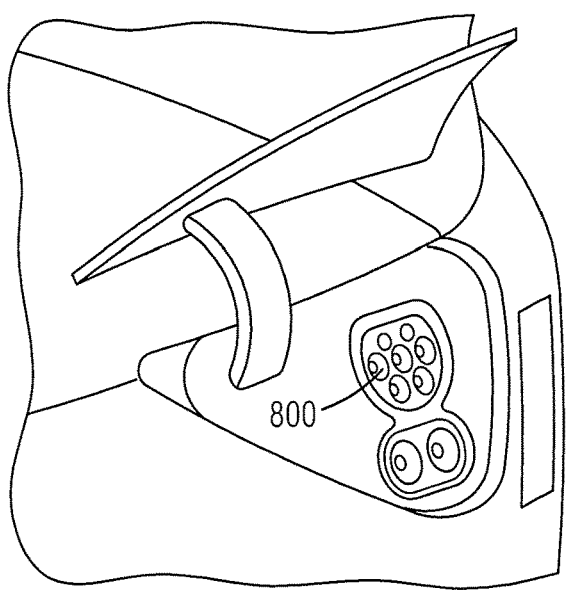

INDICATING DRIVING BATTERY CHARGER RELATED INFORMATION INSIDE AN ELECTRIC VEHICLE TO A USER OF THE ELECTRIC VEHICLE

BACKGROUND

1. Field

Aspects of the present invention relate to indicating driving battery charger related information inside a plug-in electric vehicle to a user of the electric vehicle.

2. Description of the Related Art

There are many different kinds of charger plugs for electric cars. For example, the type of the plug may be either a type 1, a type 2, a combined charging system (CSS) type, a CHAdeMO type, or a Tesla supercharger type.

However, a driver of an electric vehicle (EV) may not know the plug type and other characteristics of the battery charger required for charging the EV. For example, the driver may have rented the EV from a rental car company at an airport. There is no handy place where this driving battery charger related information is readily available to the driver in the EV.

At a charging station there may be different plug types available to use, confusing the driver as to which one to use. There may be need to go to a specific public charging station to charge the EV, such as a TESLA charging station. Tesla also has many different plug port types in its different models. To search for a charging station, knowledge of a specific plug type is required. Absent this driving battery charger related information, a driver may struggle to easily find this information.

More smart means for indicating driving battery charger related information inside an electric vehicle to a user of the electric vehicle are needed.

SUMMARY

Briefly described, aspects of the present invention relate to a plug-in electric vehicle for displaying driving battery charger related information inside the electric vehicle to a user of the electric vehicle. An apparatus is provided for indicating information in an electric vehicle, having a battery pack for solely propelling the electrical vehicle, to a user of the electric vehicle. The apparatus comprises a dashboard and a user interface including an indicator having a symbol that displays a charge port pin format associated with a charge port of the electric vehicle that is used for externally charging the electric vehicle. The indicator further includes a pointer that points to a physical location of the charge port being external to the electric vehicle in terms of an orientation of the charge port relative to a driver seat.

In accordance with one illustrative embodiment of the present invention, an apparatus is provided for indicating information in a plug-in electric vehicle, having a battery pack for solely propelling the electrical vehicle, to a user of the electric vehicle. The apparatus comprises a dashboard configured for displaying various information about vehicle metrics and a user interface located in the dashboard of the electric vehicle. The user interface includes an indicator having a symbol that displays a charge port pin format associated with a charge port of the electric vehicle that is used for externally charging the electric vehicle.

In accordance with another illustrative embodiment of the present invention, a plug-in electric vehicle is provided. It comprises a battery pack for solely propelling the electrical vehicle, a dashboard configured for displaying various information about vehicle metrics and a user interface located in the dashboard of the electric vehicle. The user interface is configured for indicating information in the electric vehicle to a user of the vehicle and the user interface including an indicator having a symbol that displays a charge port pin format associated with a charge port of the electric vehicle that is used for externally charging the electric vehicle.

Consistent with yet another embodiment, a method of communicating information to a user of an electric vehicle is provided. The method comprises providing a battery pack for solely propelling the electrical vehicle, providing a dashboard configured for displaying various information about vehicle metrics and providing a user interface located in the dashboard of the electric vehicle. The user interface is configured for indicating information in the electric vehicle to a user of the vehicle and the user interface including an indicator having a symbol that displays a charge port pin format associated with a charge port of the electric vehicle that is used for externally charging the electric vehicle.

BRIEF DESCRIPTION OF THE DRAWINGS

FIG. 6 illustrates a schematic of a type 1 female/receptacle/socket/port in accordance with an exemplary embodiment of the present invention.

FIG. 7 illustrates a schematic of a tesla supercharger female/receptacle/socket/port in accordance with an exemplary embodiment of the present invention.

FIG. 8 illustrates a schematic of a Combined Charging System (CCS) female/receptacle/socket/port in accordance with an exemplary embodiment of the present invention.

DETAILED DESCRIPTION

To facilitate an understanding of embodiments, principles, and features of the present invention, they are explained hereinafter with reference to implementation in illustrative embodiments. In particular, they are described in the context of a type of indicator having a symbol that displays a charge port pin format, a pointer that points to a physical location of the charge port and a marker that indicates a type of a plug to be used in the charge port for charging the electric vehicle. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

Although some embodiments of this invention may be described and illustrated herein in terms of five charge pin formats or layouts or pinouts, it should be understood that embodiments of this invention are not so limited, but are generally applicable to any number of charge pin formats or layouts or pinouts. Further, although some embodiments of this invention may be described and illustrated herein in the context of a graphic, it should be understood that embodiments of this invention are not so limited, but are generally applicable to any type of communication medium as the invention may use audio and/or video means to communication charger related information to a driver of a plug-in electric vehicle.

Figure 1:
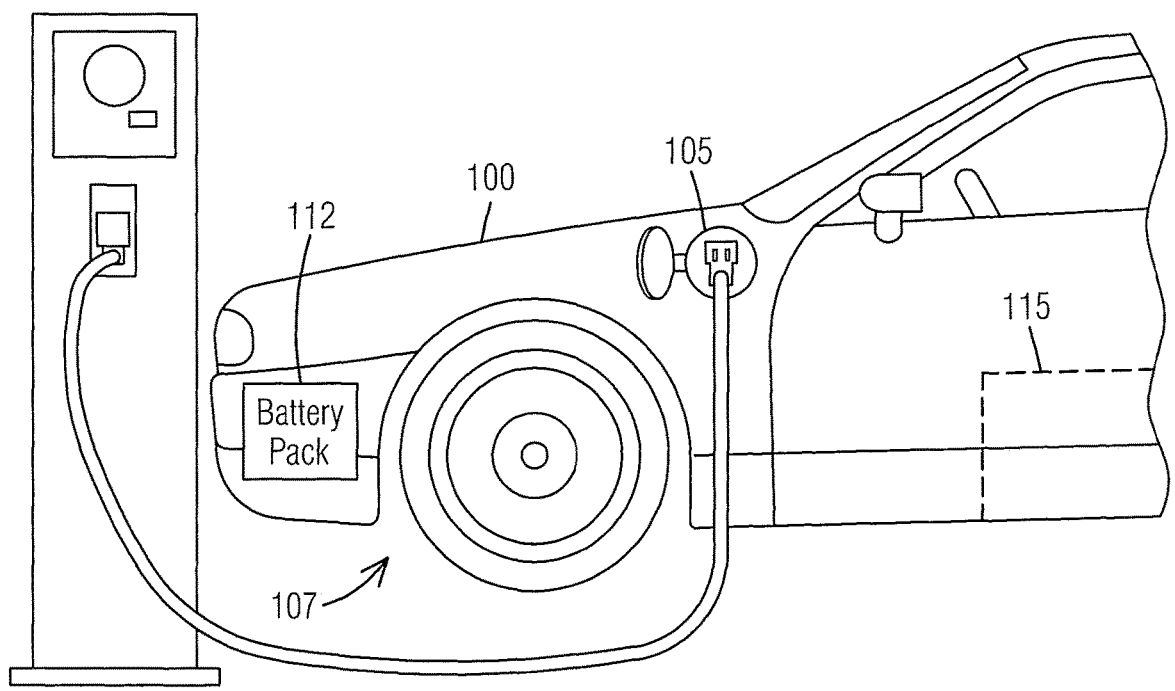
FIG. 1 illustrates a schematic of an electric vehicle with a charge port on a side being charged at a public charging station in accordance with an exemplary embodiment of the present invention.

FIG. 1 illustrates a schematic of a plug-in electric vehicle (EV) 100 with a charge port 105 on a side 107 being charged at a public charging station 110 in accordance with an exemplary embodiment of the present invention. The plug-in electric vehicle 100 includes a battery pack 112 for solely propelling the electrical vehicle 100 and a driver seat 115.

There are many different kinds of charger plugs for electric cars. For example, the type of the plug may be either a type 1, a type 2, a combined charging system (CSS) type, a CHAdeMO type, or a Tesla supercharger type. At a charging station there may be different plug types available to use, there may be a need to search for a charging station, there may be need to go to a specific public charging station to charge the EV and/or a driver of the plug-in electric vehicle (EV) 100 may not know the plug type and other characteristics of the battery charger required for charging the EV 100 but the present invention will enable him/her to easily locate this information on a dashboard of a vehicle. For example, the driver may have rented the EV 100 from a rental car company at an airport yet he/she can look at the electric vehicle dashboard to identify the plug type of and the pinout format to use at a public charging station. This is a handy place where this driving battery charger related information is readily available to the driver in the EV 100. With this driving battery charger related information, a driver may not struggle to easily find this information.

The charge port 105 may be a standard J1772 electric power receptacle that can receive power from Level 1 or Level 2 charging equipment. The CHAdeMO DC fast charge receptacle uses a different type of connector. To get the most out of your plug-in EV 100, you must charge it on a regular basis. Charging frequently maximizes the range of all-electric vehicles and the electric-only miles of plug-in hybrid electric vehicles. Drivers can charge at home, at work, or in public places. While most drivers do more than 80% of their charging at home and it is often the least expensive option, workplace and public charging can complement residential charging.

Charging the EV 100 requires plugging into a charger connected to the electric grid, also called electric vehicle supply equipment (EVSE). There are three major categories of chargers, based on the maximum amount of power the charger provides to the battery from the grid:

Level 1: Provides charging through a 120 V AC plug and does not require installation of additional charging equipment. Can deliver 2 to 5 miles of range per hour of charging. Most often used in homes, but sometimes used at workplaces.

Level 2: Provides charging through a 240 V (for residential) or 208 V (for commercial) plug and requires installation of additional charging equipment. Can deliver 10 to 20 miles of range per hour of charging. Used in homes, workplaces, and for public charging.

DC Fast Charge: Provides charging through 480 V AC input and requires highly specialized, high-powered equipment as well as special equipment in the vehicle itself. (Plug-in hybrid electric vehicles typically do not have fast charging capabilities.) Can deliver 60 to 80 miles of range in 20 minutes of charging. Used most often in public charging stations, especially along heavy traffic corridors.

Charging times range from less than 30 minutes to 20 hours or more based on the type of EVSE, as well as the type of battery, how depleted it is, and its capacity. All-electric vehicles typically have more battery capacity than plug-in hybrid electric vehicles, so charging a fully depleted all-electric vehicle takes longer.

In addition to the three types above, wireless charging uses an electro-magnetic field to transfer electricity to the EV 100 without a cord. The Department of Energy is supporting research to develop and improve wireless charging technology. Wireless chargers are currently available for use with certain vehicle models.

Most modern chargers and vehicles have a standard connector and receptacle, called the SAE J1772. Any vehicle with this plug receptacle can use any Level 1 or Level 2 EVSE. All major vehicle and charging system manufacturers support this standard, so your vehicle should be compatible with nearly all non-fast charging workplace and public chargers.

Fast charging currently does not have a consistent standard connector. SAE International, an engineering standards-setting organization, has passed a standard for fast charging that adds high-voltage DC power contact pins to the SAE J1772 connector currently used for Level 1 and Level 2. This connector enables use of the same receptacle for all levels of charging, and is available on certain models like the Chevrolet Spark EV. However, other EVs (the Nissan Leaf and Mitsubishi i-MiEV in particular) use a different type of fast-charge connector called CHAdeMO. Fortunately, an increasing number of fast chargers have outlets for both SAE and CHAdeMO fast charging. Lastly, Tesla's Supercharger system can only be used by Tesla vehicles and is not compatible with vehicles from any other manufacturer. Tesla vehicles can use CHAdeMO connectors through a vehicle adapter.

Figure 2:
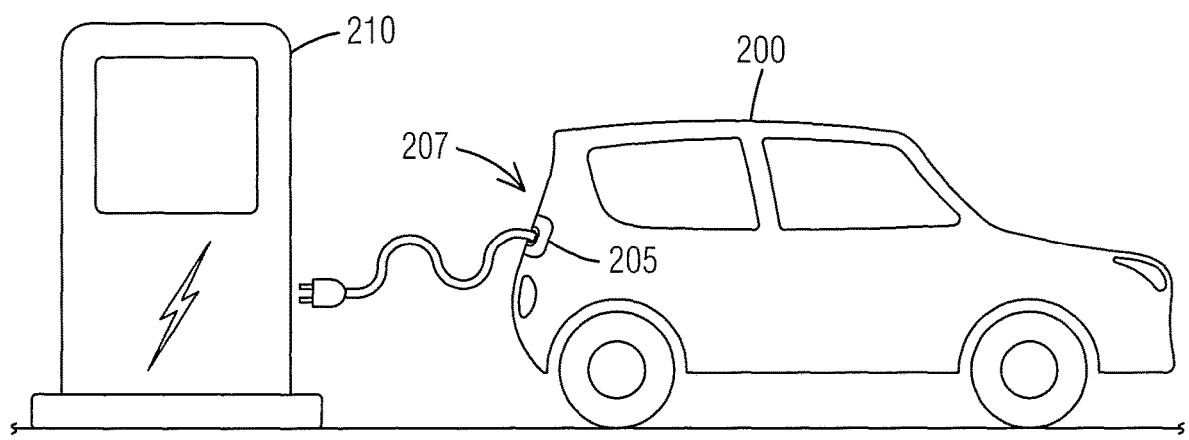
FIG. 2 illustrates a schematic of an electric vehicle with a charge port in a back being charged at a public charging station in accordance with an exemplary embodiment of the present invention.

FIG. 2 illustrates a schematic of a plug-in electric vehicle (EV) 200 with a charge port 205 in a back 207 being charged at a public charging station 210 in accordance with an exemplary embodiment of the present invention. An EV can be charged from front, back, left side or right side depending upon the location of the charge port.

Figure 3:
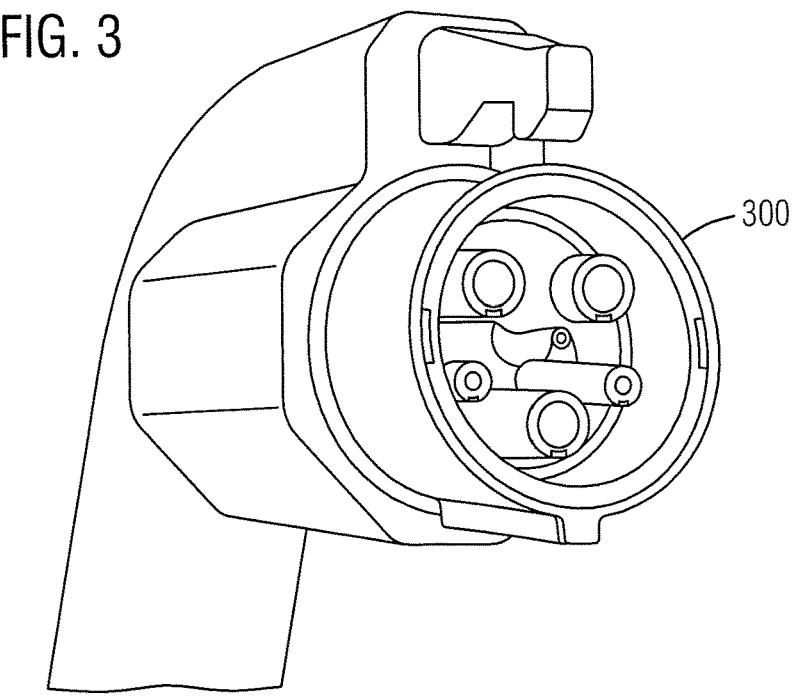
FIG. 3 illustrates a standard type 1 (J1772) electric power plug type in accordance with an exemplary embodiment of the present invention.

FIG. 3 illustrates a standard type 1 (J1772) electric power plug 300 in accordance with an exemplary embodiment of the present invention. The type 1 plug 300 is a single-phase plug which allows for charging power levels of up to 7.4 kW (230 V, 32 A). The standard is mainly used in car models from the Asian region, and is rare in Europe, which is why there are very few public type 1 charging stations. SAE J1772 (IEC Type 1) electric power plug 300, also known as a "J plug", is a North American standard for electrical connectors for electric vehicles maintained by the SAE International and has the formal title "SAE Surface Vehicle Recommended Practice J1772, SAE Electric Vehicle Conductive Charge Coupler". It covers the general physical, electrical, communication protocol, and performance requirements for the electric vehicle conductive charge system and coupler. The intent is to define a common electric vehicle conductive charging system architecture including operational requirements and the functional and dimensional requirements for the vehicle inlet and mating connector. The SAE J1772-2009 was adopted by the car manufacturers of post-2000 electric vehicles like the third generation of the Chevrolet Volt and Nissan Leaf as the early models. The connector became standard equipment in the U.S. market due to the availability of charging stations with that plug type in the nation's electric vehicle network (with the help of funding such as ChargePoint America program drawing grants from provisions of the American Recovery and Reinvestment Act).

Figure 4:
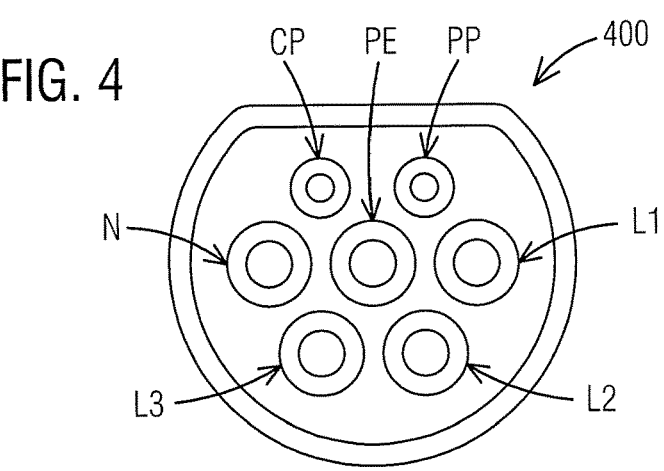
FIG. 4 illustrates a schematic of a type 2 female plug pinout in accordance with an exemplary embodiment of the present invention.
Figure 5:
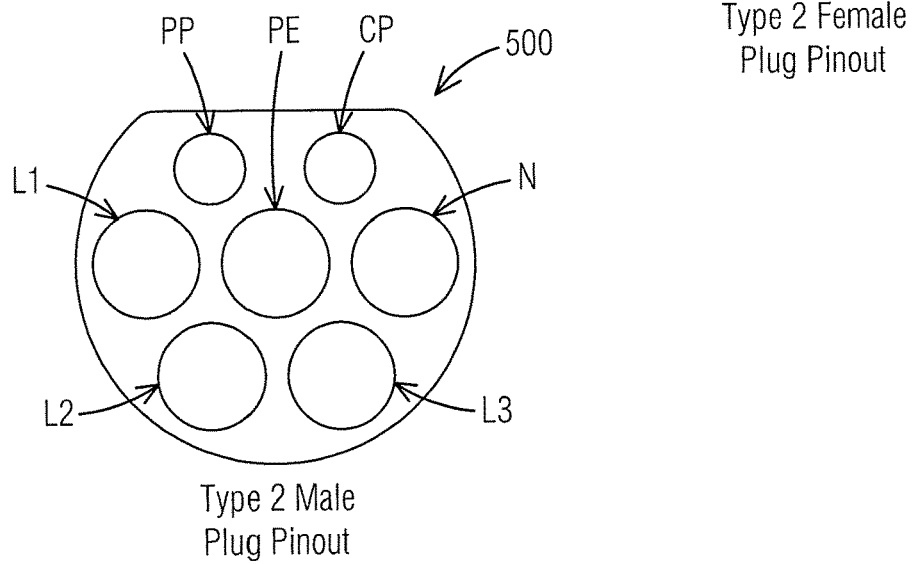
FIG. 5 illustrates a schematic of a type 2 male plug pinout in accordance with an exemplary embodiment of the present invention.

FIG. 4 illustrates a schematic of a type 2 female plug pinout 400 in accordance with an exemplary embodiment of the present invention. FIG. 5 illustrates a schematic of a type 2 male plug pinout 500 in accordance with an exemplary embodiment of the present invention.

The IEC 62196 Type 2 connector (commonly referred to as mennekes) is used for charging electric cars within Europe. The connector is circular in shape, with a flattened top edge and originally specified for charging battery electric vehicles at 3-50 kilowatts, with a plug modified by Tesla capable of outputting 120 kilowatts. Electric power is provided as single-phase or three-phase alternating current (AC), or direct current (DC). In January 2013, the IEC 62196 Type 2 connector was selected by the European Commission as official charging plug within the European Union. It has since been adopted as the recommended connector in some countries outside of Europe, including New Zealand. Released under the name SAE J3068 is three-phase AC connector for North America—with Local Interconnect Network (LIN) for control signaling based on IEC 61851-1 Edition 3 Annex D.

Pinouts for Type 2 male and female electric vehicle charging plugs
PP Proximity pre-insertion signalling pilot
CP Control pilot post-insertion signalling
PE Protective full-current protective earthing earth system-6-millimetre (0.24 in) diameter
N Neutral single-/three-phase AC/DC-mid
L1 Line 1 single-/three-phase AC/DC-mid
L2 Line 2 three-phase AC/DC-mid
L3 Line 3 three-phase AC/DC-mid
Combo 2 extension adds two extra high-current DC pins underneath, does not use the AC pins and is becoming the universal standard for charging.

FIG. 6 illustrates a schematic of a type 1 female/receptacle/socket/port 600 in accordance with an exemplary embodiment of the present invention. FIG. 7 illustrates a schematic of a tesla supercharger female/receptacle/socket/port 700 in accordance with an exemplary embodiment of the present invention. FIG. 8 illustrates a schematic of a Combined Charging System (CCS) female/receptacle/socket/port 800 in accordance with an exemplary embodiment of the present invention.

Figure 9:
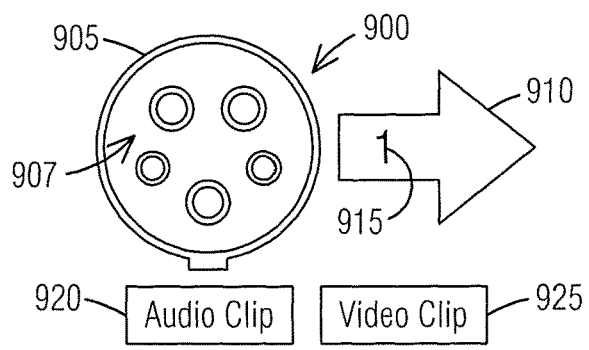
FIG. 9 illustrates a schematic of a type 1 indicator having a symbol that displays a charge port pin format, a pointer that points to a physical location of the charge port and a marker that indicates a type of a plug to be used in the charge port for charging the electric vehicle in accordance with an exemplary embodiment of the present invention.

FIG. 9 illustrates a schematic of a type 1 indicator 900 having a symbol 905 that displays a charge port pin format 907, a pointer 910 that points to a physical location of the charge port 600 and a marker 915 that indicates a type of the plug 300 to be used in the charge port 600 for charging the electric vehicle (100, 200) in accordance with an exemplary embodiment of the present invention. The indicator 900 may be an electronic display or a permanently printed sign. The indicator 900 may include an audio clip 920 and/or a video clip 925 both capable of playback by the EV 100, 200. The indicator 900 may be an electronic button display which interactively provides more information about charging the electric vehicle 100, 200. For example, pressing/touching the indicator 900 the audio clip 920 and/or the video clip 925 may play sound and picture.

Figure 10:
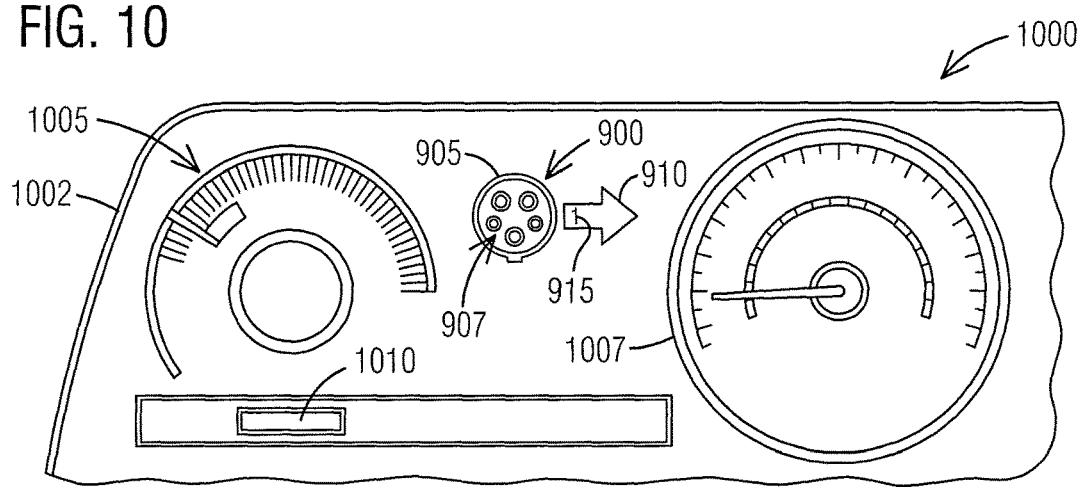
FIG. 10 illustrates a schematic of an apparatus including a dashboard and a user interface located in the dashboard of the electric vehicle with the type 1 indicator of FIG. 9 in accordance with an exemplary embodiment of the present invention.

FIG. 10 illustrates a schematic of an apparatus 1000 for indicating information in a plug-in electric vehicle 100, 200, having the battery pack 112 (see FIG. 1) for solely propelling the electrical vehicle 100, 200, to a user of the electric vehicle 100, 200. The apparatus 1000 comprising a dashboard 1002 and a user interface 1005 located in the dashboard 1002 of the electric vehicle 100, 200 with the type 1 indicator 900 of FIG. 9 in accordance with an exemplary embodiment of the present invention. The indicator 900 may be disposed next to an odometer 1007 and a reserve charge scale 1010 in the dashboard 1002.

The dashboard 1002 is configured for displaying various information about vehicle metrics. The user interface 1005 is located in the dashboard 1002 of the electric vehicle 100, 200, wherein the user interface 1005 includes the indicator 900. The indicator 900 has the symbol 905 that displays the charge port pin format 907 associated with the charge port 600 of the electric vehicle 100, 200 that is used for externally charging the electric vehicle 100, 200.

The indicator 900 further includes the pointer 910 that points to a physical location of the charge port 600 being external to the electric vehicle 100, 200 in terms of an orientation of the charge port 600 relative to the driver seat 115 (see FIG. 1). The pointer 910 may be an arrow pointing to a specific direction next to the symbol 905. The arrow may not be filled but is a line shaped as the arrow such that the arrow having an unfilled area in which the marker 915 is disposed to indicate a type of a plug, i.e. the standard type 1 (J1772) electric power plug 300 to be used in the charge port 600 for charging the electric vehicle 100, 200. Of course, e.g., the type of the plug may be either a type 1, a type 2, a combined charging system (CSS) type, a CHAdeMO type, or a Tesla supercharger type.

Figure 11:
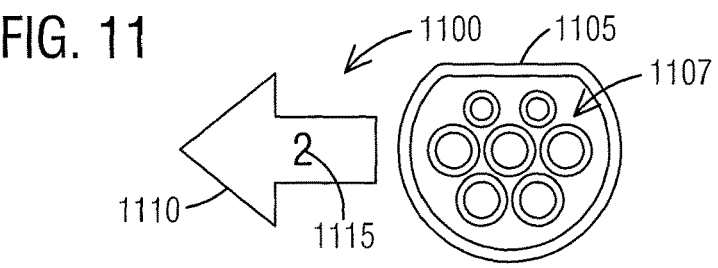
FIG. 11 illustrates a schematic of a type 2 indicator in accordance with an exemplary embodiment of the present invention.

FIG. 11 illustrates a schematic of a type 2 indicator 1100 in accordance with an exemplary embodiment of the present invention. The type 2 indicator 1100 has a symbol 1105 that displays a charge port pin format 1107, a pointer 1110 that points to a physical location of the charge port and a marker 1115 that indicates a type of the plug to be used in the charge port for charging the electric vehicle (100, 200) in accordance with an exemplary embodiment of the present invention. The pointer 1110 here points to left, meaning the charge port is on the left side 107 of the EV 100. The marker 1115 labelled as "2" indicates the plug type to be type 2. The marker 1115 labelled as "2" helps distinguish the plug type to be type 2 from the Tesla supercharger plug type which has the same pinout format.

The triple-phase plug's main area of distribution is Europe, and is considered to be the standard model. In private spaces, charging power levels of up to 22 kW are common, while charging power levels of up to 43 kW (400 V, 63 A, AC) can be used at public charging stations. Most public charging stations are equipped with a type 2 socket. All mode 3 charging cables can be used with this, and electric cars can be charged with both type 1 and type 2 plugs. All mode 3 cables on the sides of charging stations have so-called Mennekes plugs (type 2).

Figure 12:
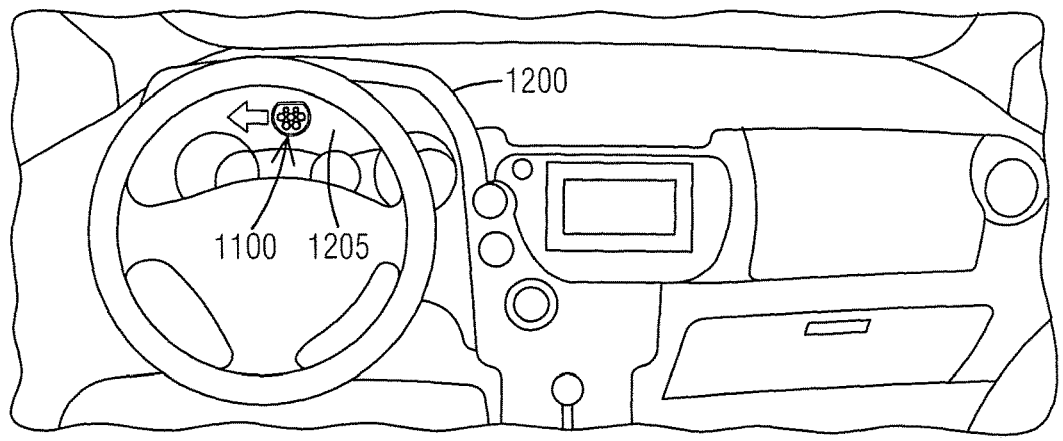
FIG. 12 illustrates a schematic of a dashboard and a user interface located in the dashboard of the electric vehicle with the type 2 indicator of FIG. 11 in accordance with an exemplary embodiment of the present invention.

FIG. 12 illustrates a schematic of a dashboard 1200 and a user interface 1205 located in the dashboard 1200 of the electric vehicle with the type 2 indicator 1100 of FIG. 11 in accordance with an exemplary embodiment of the present invention. The type 2 indicator 1100 may be located in front of the driver seat 115 in a visual area in front of a driver so it is visible to the driver with ease. The type 2 indicator 1100 may be lighted in different colours as a light emitting diode (LED) to show different status of the charging level or a fault with the charging circuitry of the EV 100. For example, a green light colour of the indicator 1100 indicates the charging circuitry is in good health and a red light colour indicates the charging circuitry is not in good health and needs repair/inspection/testing etc.

Figure 13:
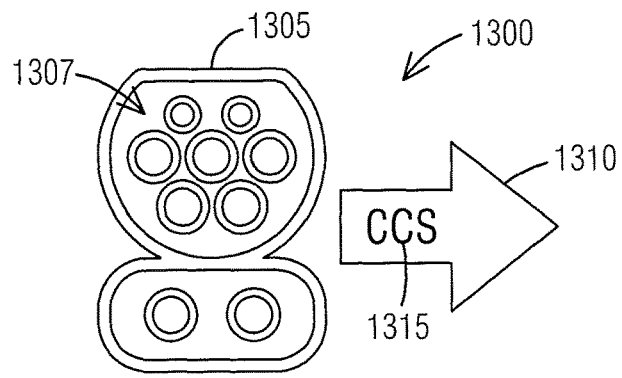
FIG. 13 illustrates a schematic of a type CCS indicator in accordance with an exemplary embodiment of the present invention.

FIG. 13 illustrates a schematic of a type CCS indicator 1300 in accordance with an exemplary embodiment of the present invention. The type CCS indicator 1300 has a symbol 1305 that displays a charge port pin format 1307, a pointer 1310 that points to a physical location of the charge port 800 and a marker 1315 that indicates a type of the plug to be used in the charge port 800 for charging the electric vehicle (100, 200) in accordance with an exemplary embodiment of the present invention. The pointer 1310 here points to right, meaning the charge port is on the right side of the EV. The marker 1315 labelled as "CCS" indicates the plug type to be type CCS.

The CCS plug is an enhanced version of the type 2 plug, with two additional power contacts for the purposes of quick charging, and supports AC and DC charging power levels (alternating and direct current charging power levels) of up to 170 kW. In practice, the value is usually around 50 kW.

Figure 14:
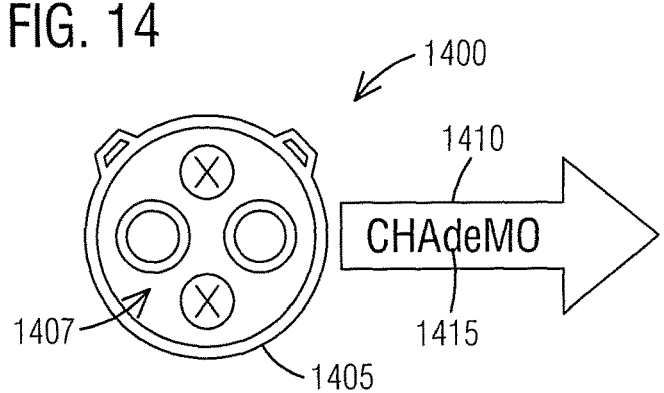
FIG. 14 illustrates a schematic of a type CHAdeMO indicator in accordance with an exemplary embodiment of the present invention.

FIG. 14 illustrates a schematic of a type CHAdeMO indicator 1400 in accordance with an exemplary embodiment of the present invention. The type CHAdeMO indicator 1400 has a symbol 1405 that displays a charge port pin format 1407, a pointer 1410 that points to a physical location of the charge port and a marker 1415 that indicates a type of the plug to be used in the charge port for charging the electric vehicle (100, 200) in accordance with an exemplary embodiment of the present invention. The pointer 1410 here points to right, meaning the charge port is on the right side of the EV. The marker 1415 labelled as "CHAdeMO" indicates the plug type to be type CHAdeMO.

This quick charging system was developed in Japan, and allows for charging capacities up to 50 kW at the appropriate public charging stations. The following manufacturers offer electric cars which are compatible with the CHAdeMO plug: BD Otomotive, Citroen, Honda, Kia, Mazda, Mitsubishi, Nissan, Peugeot, Subaru, Tesla (with adaptor) and Toyota.

Figure 15:
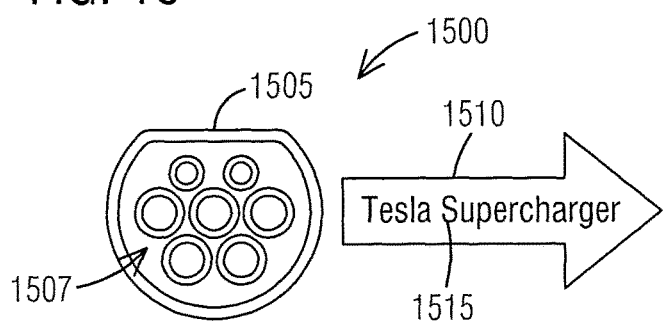
FIG. 15 illustrates a schematic of a type Tesla supercharger indicator in accordance with an exemplary embodiment of the present invention.

FIG. 15 illustrates a schematic of a type Tesla supercharger indicator 1500 in accordance with an exemplary embodiment of the present invention. The type Tesla supercharger indicator 1500 has a symbol 1505 that displays a charge port pin format 1507, a pointer 1510 that points to a physical location of the charge port 700 and a marker 1515 that indicates a type of the plug to be used in the charge port 700 for charging the electric vehicle (100, 200) in accordance with an exemplary embodiment of the present invention. The pointer 1510 here points to right, meaning the charge port is on the right side of the EV. The marker 1515 labelled as "Tesla supercharger" indicates the plug type to be type Tesla supercharger.

For its supercharger, Tesla uses a modified version of the type 2 Mennekes plug. This allows for the Model S to recharge to 80% within 30 minutes. Tesla offers charging to its customers for free. To date it has not been possible for other makes of car to be charged with Tesla superchargers.

Figure 16:
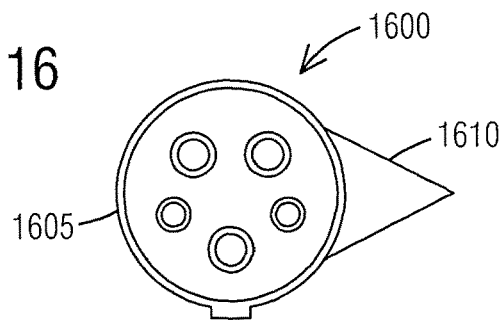
FIG. 16 illustrates a schematic of a type 1 indicator with a pointer integrated with a symbol in accordance with an exemplary embodiment of the present invention.

FIG. 16 illustrates a schematic of a type 1 indicator 1600 with a pointer 1610 integrated with a symbol 1605 in accordance with an exemplary embodiment of the present invention. The pointer 1610 is integrated with the symbol 1605 such that the pointer 1610 points to a physical location of the charge port being external to the electric vehicle in terms of an orientation of the charge port relative to a driver seat. The type of the plug may be either a type 1, a type 2, a combined charging system (CSS) type, a CHAdeMO type, or a Tesla supercharger type.

Figure 17:
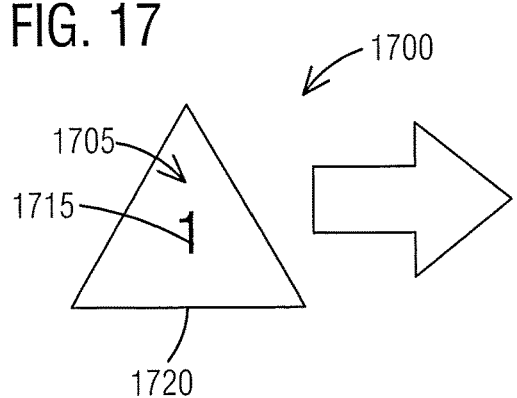
FIG. 17 illustrates a schematic of a type 1 indicator wherein the symbol instead of displaying the charge port pin format displays a marker that is disposed to indicate a type of a plug in accordance with an exemplary embodiment of the present invention.

FIG. 17 illustrates a schematic of a type 1 indicator 1700 wherein a symbol 1705 instead of displaying the charge port pin format displays a marker 1715 that is disposed to indicate a type of a plug to be used in the charge port for charging the electric vehicle in accordance with an exemplary embodiment of the present invention. Although a triangle 1720 is shown to encircle "1" but this triangle 1720 is optional and only "1" can be both the symbol 1705 and the marker 1715 in one embodiment. The type of the plug may be either a type 1, a type 2, a combined charging system (CSS) type, a CHAdeMO type, or a Tesla supercharger type.

Figure 18:
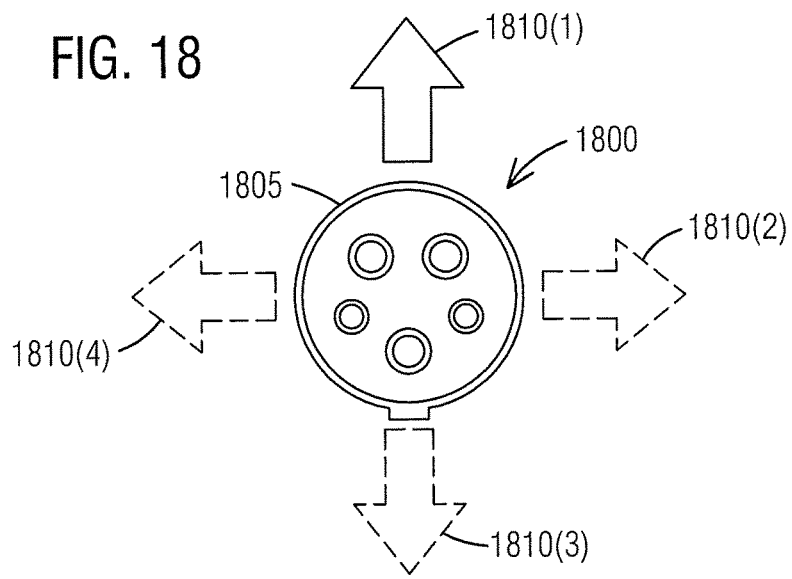
FIG. 18 illustrates a schematic of a type 1 indicator with a pointer in anyone of four locations 360 degree around the symbol in accordance with an exemplary embodiment of the present invention.

FIG. 18 illustrates a schematic of a type 1 indicator 1800 with a pointer 1810 in anyone of four locations 1810(1-4) 360 degree around a symbol 1805 in accordance with an exemplary embodiment of the present invention. For example, the pointer 1800(1) on the top indicates a charge port in the front of the EV. The pointer 1800(2) on the right indicates a charge port in the right side of the EV. The pointer 1800(3) on the bottom indicates a charge port in the back side of the EV. The pointer 1800(4) on the left indicates a charge port in the left side of the EV.

Figure 19:
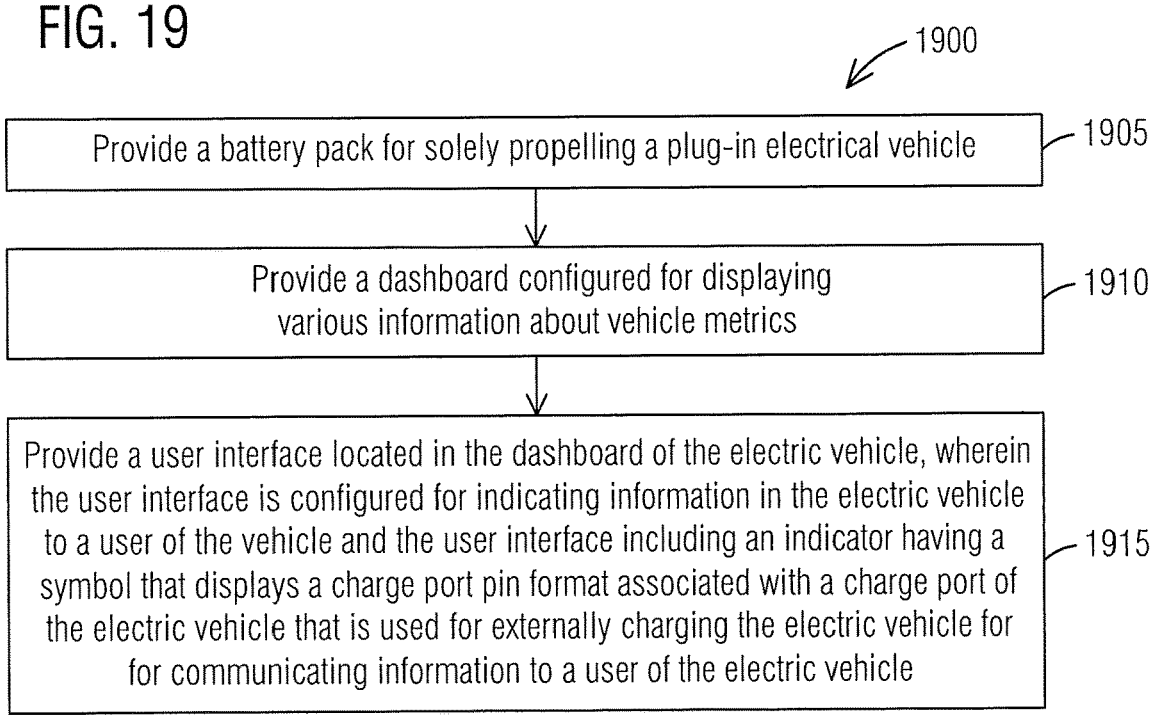
FIG. 19 illustrates a flow chart of a method of communicating information to a user of an electric vehicle in accordance with an exemplary embodiment of the present invention.

FIG. 19 illustrates a flow chart of a method 1900 of communicating information to a user of the electric vehicle 100 in accordance with an exemplary embodiment of the present invention. Reference is made to the elements and features described in FIGS. 1-18. It should be appreciated that some steps are not required to be performed in any particular order, and that some steps are optional.

In step 1905, the method 1900 includes providing a battery pack for solely propelling the electrical vehicle. In step 1910, the method 1900 includes providing a dashboard configured for displaying various information about vehicle metrics. In step 1905, the method 1915 includes providing a user interface located in the dashboard of the electric vehicle. The user interface is configured for indicating information in the electric vehicle to a user of the vehicle and the user interface including an indicator having a symbol that displays a charge port pin format associated with a charge port of the electric vehicle that is used for externally charging the electric vehicle.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Although the steps, operations, or computations may be presented in a specific order, this order may be changed in different embodiments. In some embodiments, to the extent multiple steps are shown as sequential in this specification, some combination of such steps in alternative embodiments may be performed at the same time.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. An apparatus for indicating information in a plug-in electric vehicle, having a battery pack for solely propelling the electrical vehicle, to a user of the electric vehicle, the apparatus comprising:
   a dashboard configured for displaying various information about vehicle metrics; and
   a user interface located in the dashboard of the electric vehicle, wherein the user interface including an indicator having:
   a symbol that displays a charge port pin format associated with a charge port of the electric vehicle that is used for externally charging the electric vehicle.

2. The apparatus of claim 1, wherein the indicator further including:
   a pointer that points to a physical location of the charge port being external to the electric vehicle in terms of an orientation of the charge port relative to a driver seat.

3. The apparatus of claim 2, wherein the pointer is an arrow pointing to a specific direction next to the symbol.

4. The apparatus of claim 3, wherein the arrow is not filled but is a line shaped as the arrow such that the arrow having an unfilled area in which a marker is disposed to indicate a type of a plug to be used in the charge port for charging the electric vehicle.

5. The apparatus of claim 4, wherein the type of the plug is either a type 1, a type 2, a combined charging system (CSS) type, a CHAdeMO type, or a Tesla supercharger type.

6. The apparatus of claim 1, wherein the indicator further including:
   a pointer integrated with the symbol such that the pointer points to a physical location of the charge port being external to the electric vehicle in terms of an orientation of the charge port relative to a driver seat.

7. The apparatus of claim 1, wherein the symbol instead of displaying the charge port pin format displays a marker that is disposed to indicate a type of a plug to be used in the charge port for charging the electric vehicle.

8. The apparatus of claim 7, wherein the type of the plug is either a type 1, a type 2, a combined charging system (CSS) type, a CHAdeMO type, or a Tesla supercharger type.

9. The apparatus of claim 1, wherein the indicator is an electronic display or a permanently printed sign.

10. The apparatus of claim 1, wherein the indicator includes an audio clip and/or a video clip.

11. The apparatus of claim 1, wherein the indicator is an electronic button display which interactively provides more information about charging the electric vehicle.

12. The apparatus of claim 1, wherein the indicator is disposed next to an odometer and a reserve charge scale in the dashboard.

13. A plug-in electric vehicle, comprising:
    a battery pack for solely propelling the electrical vehicle;
    a dashboard configured for displaying various information about vehicle metrics; and
    a user interface located in the dashboard of the electric vehicle, wherein the user interface is configured for indicating information in the electric vehicle to a user of the vehicle and the user interface including an indicator having:
    a symbol that displays a charge port pin format associated with a charge port of the electric vehicle that is used for externally charging the electric vehicle.

14. The electric vehicle of claim 13, wherein the indicator further including:
    a pointer that points to a physical location of the charge port being external to the electric vehicle in terms of an orientation of the charge port relative to a driver seat.

15. The electric vehicle of claim 14, wherein the pointer is an arrow pointing to a specific direction next to the symbol.

16. The electric vehicle of claim 15, wherein the arrow is not filled but is a line shaped as the arrow such that the arrow having an unfilled area in which a marker is disposed to indicate a type of a plug to be used in the charge port for charging the electric vehicle.

17. The electric vehicle of claim 16, wherein the type of the plug is either a type 1, a type 2, a combined charging system (CSS) type, a CHAdeMO type, or a Tesla supercharger type.

18. A method of communicating information to a user of an electric vehicle, the method comprising:
    providing a battery pack for solely propelling the electrical vehicle;
    providing a dashboard configured for displaying various information about vehicle metrics; and
    providing a user interface located in the dashboard of the electric vehicle, wherein the user interface is configured for indicating information in the electric vehicle to a user of the vehicle and the user interface including an indicator having:
    a symbol that displays a charge port pin format associated with a charge port of the electric vehicle that is used for externally charging the electric vehicle.

19. The method of claim 18, wherein the indicator further including:
    a pointer that points to a physical location of the charge port being external to the electric vehicle in terms of an orientation of the charge port relative to a driver seat.

20. The method of claim 19, wherein the pointer is an arrow pointing to a specific direction next to the symbol.

* * * * *